United States Patent Office 3,526,750
Patented Sept. 1, 1970

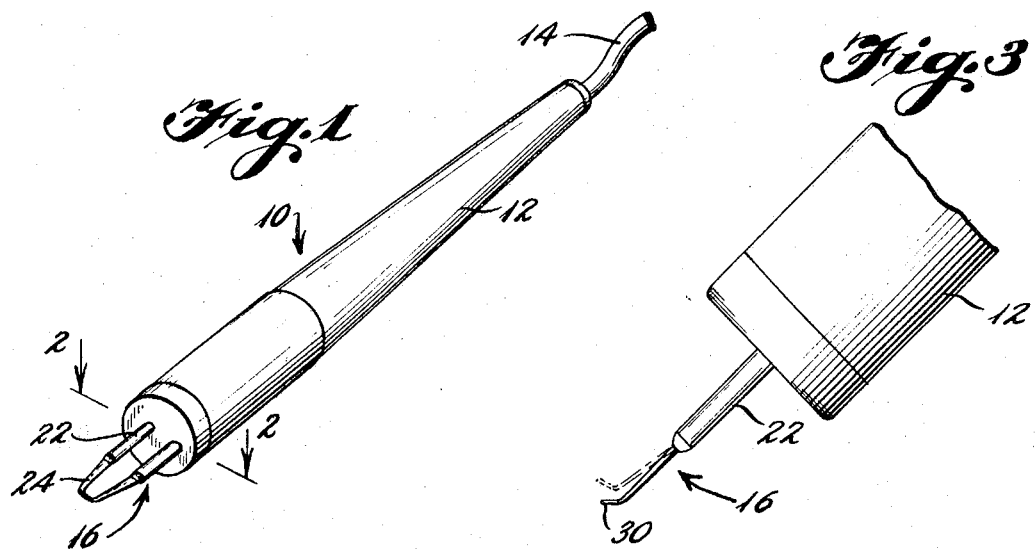
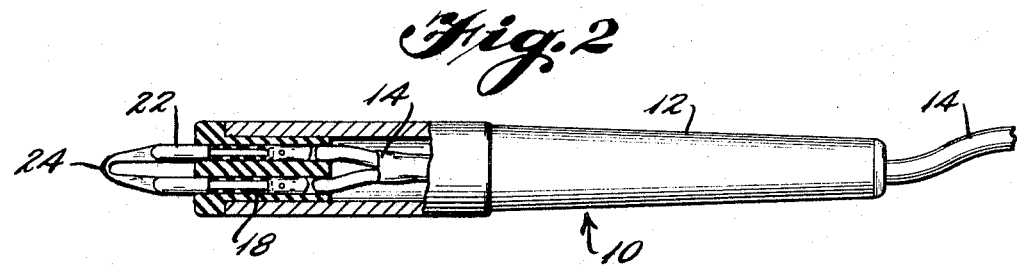
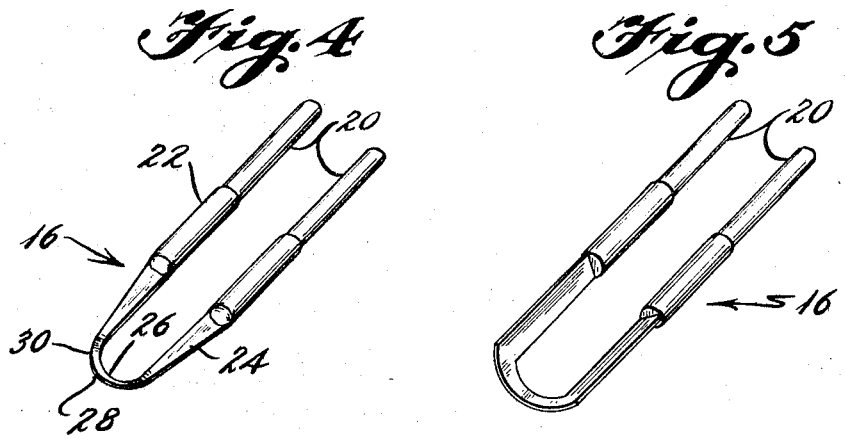

3,526,750
THERMAL TOOL
William J. Siegel, 814 E. Franklin Ave.,
Silver Spring, Md. 20901
Filed June 2, 1967, Ser. No. 643,123
Int. Cl. H05b 3/00
U.S. Cl. 219—233                       6 Claims

ABSTRACT OF THE DISCLOSURE

The device of the present invention is an electrically heated tool which may be used for both soldering and thermal parting, and is characterized by a specially shaped hairpin loop working tip. The tip is a thinned down flat blade-like member, the flat of the blade being at an angle to the plane of the hairpin loop as a whole.

---

The present invention relates to a thermal tool which may be employed as an electric hot knife or as a soldering tool.

Both soldering guns and electric hot knives have been formed with a working tip in the shape of a hairpin loop heated by electrical resistance. Normally the looped end is of greatly reduced cross-section relative to the leg end of the tip which is what causes the looped end to resistance heat on passage of current. The increased electrical resistance of the looped end relative to the leg portions concentrates the heating effect at the looped end, although often the leg portions do resistance heat somewhat. Despite this overall similarity, the details of construction at the looped end sharply differentiate the electric hot knife from the soldering tool. The knife is provided with a cutting edge of some sharpness while the soldering tool is provided with a tip-end structure adapted to hold a glob of solder. No such incompatibility exists in the present thermal tool. The looped end of the hairpin loop may be employed for either soldering or thermal parting, i.e., cutting.

The object of this invention is to provide a thermal tool either for soldering or for thermal parting characterized by considerable sensitivity.

According to the present invention the heating tip of the hairpin loop is of a special shape wherein the leg portions are relatively thick, so much so that they resistance heat very little. The looped end, on the other hand, is thinned down to where it may be termed a blade and the flat of the blade is angularly offset from the plane of the hairpin loop as a whole. The entire blade portion of the heating tip is relatively resilient and thereby provides spring resistance to any force applied at the blade portion of the hairpin loop. Thus, regardless of whether the blade is used for thermal parting or for soldering, the angular offset thereof from the plane of the hairpin tip as a whole generates a force which causes a spring-like deflection of the blade portion. Thus, the operator can develop a tactile feel for the tool, and adjust his touch to the give (of the spring-like blade portion) of the tool.

Relatively sharpened edges on the blade permit cutting, as with any thermal parting knife. Yet the flate of the blade portion serves well to support a glob of solder or to hold down and reflow the solder of a lap joint, allowing the tool to be employed for soldering purposes. In soldering use, the flat of the blade will heat the joint during soldering, and afterward can act as a heat sink while the solder cools.

The detailed structure of the present tool and the operational advantages thereof may best be understood by reference to the accompanying drawing in which:

FIG. 1 diagrammatically represents the tool as a whole;

FIG. 2 is a section taken along line 2—2 of FIG. 1;

FIG. 3 is an enlarged side view showing the front end of the tool and illustrating the deflection of the blade portion;

FIGS. 4 and 5 diagrammatically illustrate preferred modes of heating tip.

Referring now to FIG. 1, it may be seen that the tool 10 comprises a pencil grip member 12 with power leads 14 emerging from the rear thereof and a heating tip 16 detachably mounted at the front end thereof by an appropriate quick-release friction connection (FIG. 2) of gripping members 18 which frictionally engage stepdown rear end portions 20 of the legs of heating tip 16 and which maintain a good electrical connection between tip 16 and with the terminus of power lead 14. The main exposed portion 22 of the legs of tip 16 are of increased diameter relative to rear ends 20 to provide a shoulder or stop element against insertion of tip 16 too deeply into pencil grip 12. The shoulder may be omitted altogether or replaced by a non-conductor support block disposed between the leg portions 22 (not shown). Leg portions 22 offer a large (relatively) low resistance path for the electric current, thereby minimizing resistance heating of the legs 22.

The looped end 24 of tip member 16 is a blade with relatively sharpened front and rear edges 28 and 26 and a blade flat 30 whose plane (insofar as it has a definable plane) is angularly offset from the plane in which parallel leg portions 20 and 22 lie. One mode of such offset is illustrated best in FIG. 3 wherein an actual bend is provided at the flat blade portion 30. The angular offset of blade 30 can be obtained also by trimming away metal at an angle. Thus, FIG. 5 illustrates an instance where the entire blade portion 30 amounts to a cutaway, done at about 45° to the plane of the leg portions 20 and 22. FIG. 4 shows the bent blade structure illustrated in FIGS. 1, 2, 3. The blade edges 28, 26 are sharpened, but only in a relative sense. As knife edges go, they are quite dull and without a true cutting edge. The edges 26, 28 effect thermal parting rather than cutting.

Considering the thermal tool as an entity, it may be seen that provision of readily replaceable tips (through the quick-release friction coupling) allows the user to substitute readily whatever tip may be best suited for the immediate need. The tool cools quickly so tip replacement is not time consuming. The tool is expressly adapted for close careful work which may be either soldering or thermal parting as necessary during the course of repairing solid state circuitry. In particular, the present thermal tool has been found highly advantageous for work on printed circuit boards where intense heat must be applied only to pinpoint areas. For such close work the tactile feel of the tool has proven to be of considerable benefit. In addition, the different angles provided by a complete set of heating tips (e.g. the diverse tips of FIGS. 4 5) permit a skilled operator to work on what normally are inaccessible locations of a circuit board without ruining the circuit as a whole.

While the foregoing description of this invention has been in terms of specific preferred modes such variations therefrom as will suggest themselves to workers in the art are contemplated as falling within the scope of the annexed claims.

What is claimed is:

1. A sensitive thermal tool comprising a pencil grip, power leads at the rear of said grip, and a quick-release removable resistance heated tip member at the front of said grip, said tip member further comprising a hairpin loop with leg end portions of the loop extending rearwardly into said grip and into electrical contact with said power leads and with a front looped end formed as a thinned down resilient flat blade, the forward end of said blade including the blade flat thereof being disposed in a plane and said plane being angularly offset relative to the plane in which the remainder of said hairpin loop tip member lies.

2. The tool of claim 1 wherein said resilient flat blade has relatively sharpened front and rear edges.

3. A quick-release tip member for thermal tools comprising a hairpin loop, the leg end portions of which are relatively thick and cylindrical, the looped front end thereof being a thinned down resilient flat blade, the forward end of said blade including the blade flat thereof being disposed in a plane and said plane being angularly offset relative to the plane in which the remainder of said hairpin loop tip member lies.

4. The tip member of claim 3 wherein the edges of said blade are relatively sharpened.

5. The tip member of claim 3 wherein the blade member lies generally within the planar confines of the hairpin loop as a whole but the forward end flat blade portion thereof is angled thereto at about 45°.

6. The tip member of claim 3 wherein the rearmost portions of the leg end portions are of reduced diameter relative to the balance of said leg end portions forming thereby a shoulder stop limit on the extent which the leg end portions may be inserted into a thermal tool.

References Cited
UNITED STATES PATENTS

| | | | |
|---|---|---|---|
| 1,834,555 | 12/1931 | Tittle | 30—140 |
| 2,101,913 | 12/1937 | Meyer | 219—233 |
| 2,310,844 | 2/1943 | Draeger | 219—233 X |
| 2,701,835 | 2/1955 | Anton | 219—235 X |
| 3,234,356 | 2/1966 | Babb | 219—233 |
| 2,012,938 | 9/1935 | Beuoy | 219—233 |

FOREIGN PATENTS

| | | |
|---|---|---|
| 564,175 | 10/1923 | France. |
| 832,358 | 6/1938 | France. |
| 1,315,489 | 12/1962 | France. |
| 272,606 | 3/1930 | Italy. |

ANTHONY BARTIS, Primary Examiner

U.S. Cl. X.R.

30—140; 83—171; 128—303.14; 219—230